United States Patent
Wang et al.

(10) Patent No.: US 12,506,991 B2
(45) Date of Patent: Dec. 23, 2025

(54) REDUNDANT SYSTEM AND REDUNDANCY METHOD OF FRONTHAUL NETWORK

(71) Applicant: Ufi Space co., Ltd., New Taipei (TW)

(72) Inventors: Yu-Min Wang, Tainan (TW); Meng-Chiao Lin, Taipei (TW); Yu Chih Wang, Pingtung County (TW); Che-Hung Liu, Kaohsiung (TW)

(73) Assignee: Ufi Space co., Ltd., New Taipei (TW)

( * ) Notice: Subject to any disclaimer, the term of this patent is extended or adjusted under 35 U.S.C. 154(b) by 336 days.

(21) Appl. No.: 18/480,477

(22) Filed: Oct. 3, 2023

(65) Prior Publication Data
US 2025/0088778 A1    Mar. 13, 2025

(30) Foreign Application Priority Data
Sep. 8, 2023  (TW) .................................. 112134191

(51) Int. Cl.
*H04Q 11/00* (2006.01)
*H04L 45/28* (2022.01)

(52) U.S. Cl.
CPC ......... *H04Q 11/0062* (2013.01); *H04L 45/28* (2013.01); *H04Q 2011/0081* (2013.01)

(58) Field of Classification Search
CPC ... H04W 24/04; H04W 24/08; H04W 88/085; H04W 28/0236; H04W 28/0273; H04W 28/0205; H04L 41/0668; H04L 45/28; H04Q 11/0062; H04Q 2011/0081; H04B 10/27; H04B 10/29; H04B 10/40
See application file for complete search history.

(56) References Cited

U.S. PATENT DOCUMENTS

2021/0368354 A1\* 11/2021 Notargiacomo .. H04W 56/0005

\* cited by examiner

*Primary Examiner* — Lester G Kincaid
(74) *Attorney, Agent, or Firm* — JCIPRNET

(57) ABSTRACT

A redundant system and a redundancy method of a fronthaul network are provided. The redundant system includes a first fronthaul multiplexer. The first fronthaul multiplexer includes a first group port, a second group port, a first cascade port, a first protect port, a first active port, and a first uplink circuit. The first uplink circuit includes a first summation circuit and a second summation circuit. A plurality of input terminals of the first summation circuit are coupled to the first group port and the second group port respectively, and an output terminal of the first summation circuit is coupled to the first protect port. A plurality of input terminals of the second summation circuit are coupled to the first cascade port and the output terminal of the first summation circuit respectively, and an output terminal of the second summation circuit is coupled to the first active port.

12 Claims, 7 Drawing Sheets

REDUNDANT SYSTEM AND REDUNDANCY METHOD OF FRONTHAUL NETWORK

CROSS-REFERENCE TO RELATED APPLICATION

This application claims the priority benefit of Taiwan application serial no. 112134191, filed on Sep. 8, 2023. The entirety of the above-mentioned patent application is hereby incorporated by reference herein and made a part of this specification.

BACKGROUND OF THE INVENTION

Field of the Invention

The invention relates to a redundant system and a redundancy method, and in particular to a redundant system and a redundancy method of a fronthaul network.

Description of Related Art

The O-RAN.WG4.CUS.0-vXX.XX specification specifies a cell shell function supported by fronthaul multiplexer (FHM) mode. When performing this function, the fronthaul multiplexer may transmit or receive packets/messages of "O-RAN option split 7.2X", that is, evolved common public radio interface (eCPRI) messages. Generally, eCPRI messages may include control plane messages and user plane messages.

The radio unit (RU) and baseband unit (BBU) (or virtual radio access network (vRAN)) in a fronthaul network may communicate with each other via a fronthaul multiplexer. However, the existing fronthaul network architecture may not provide redundancy and protection for the communication between the fronthaul multiplexer and the baseband unit. If the fronthaul multiplexer fails or the optical fiber between the fronthaul multiplexer and the baseband unit is damaged, there may be a complete loss of communication between the fronthaul multiplexer and the baseband unit.

SUMMARY OF THE INVENTION

The invention provides a redundant system and a redundancy method of a fronthaul network that may provide redundant protection for communication between a fronthaul multiplexer and a baseband unit.

The invention provides a redundant system of a fronthaul network, including a first fronthaul multiplexer. The first fronthaul multiplexer includes a first group port, a second group port, a first cascade port, a first protect port, a first active port, and a first uplink circuit. The first uplink circuit includes a first summation circuit and a second summation circuit. A plurality of input terminals of the first summation circuit are coupled to the first group port and the second group port respectively, and an output terminal of the first summation circuit is coupled to the first protect port. A plurality of input terminals of the second summation circuit are coupled to the first cascade port and the output terminal of the first summation circuit respectively, and an output terminal of the second summation circuit is coupled to the first active port.

In an embodiment of the invention, the redundant system further includes a second fronthaul multiplexer. The second fronthaul multiplexer includes a third group port, a fourth group port, a second cascade port, a second protect port, a second active port, and a second uplink circuit, wherein the second protect port is coupled to the first cascade port, and the first protect port is coupled to the second cascade port. The second uplink circuit includes a third summation circuit and a fourth summation circuit. A plurality of input terminals of the third summation circuit are coupled to the third group port and the fourth group port respectively, and an output terminal of the third summation circuit is coupled to the second protect port. A plurality of input terminals of the fourth summation circuit are coupled to the second cascade port and the output terminal of the third summation circuit respectively, and an output terminal of the fourth summation circuit is coupled to the second active port.

In an embodiment of the invention, the redundant system further includes a first radio unit and a second radio unit. The first radio unit is communicatively connected to the first group port and forwards a first signal to the first group port. The second radio unit is communicatively connected to the third group port and forwards a second signal to the third group port, wherein a source of the first signal and a source of the second signal are the same.

In an embodiment of the invention, the redundant system further includes a third radio unit and a fourth radio unit. The third radio unit is communicatively connected to the second group port and forwards a third signal to the second group port. The fourth radio unit is communicatively connected to the fourth group port and forwards a fourth signal to the fourth group port, wherein a source of the third signal and a source of the fourth signal are the same.

In an embodiment of the invention, the first fronthaul multiplexer further includes a first downlink circuit. The first downlink circuit includes a first copy circuit. A plurality of input terminals of the first copy circuit are respectively coupled to the first protect port and the first active port, and a plurality of output terminals of the first copy circuit are respectively coupled to the first group port, the second group port, and the first cascade port, wherein the first copy circuit copies a first signal from one of the first protect port and the first active port, and outputs the first signal via the first group port and the second group port.

In an embodiment of the invention, the first copy circuit copies the first signal from the first active port in response to no abnormality occurring in a signal source coupled to the first active port, and outputs the first signal via the first cascade port.

In an embodiment of the invention, the first copy circuit copies the first signal from the first protect port in response to an abnormality occurring in a signal source coupled to the first active port.

In an embodiment of the invention, the redundant system further includes a second fronthaul multiplexer. The second fronthaul multiplexer includes a third group port, a fourth group port, a second cascade port, a second protect port, a second active port, and a second downlink circuit, wherein the second protect port is coupled to the first cascade port, and the first protect port is coupled to the second cascade port. The second downlink circuit includes a second copy circuit. A plurality of input terminals of the second copy circuit are respectively coupled to the second protect port and the second active port, and a plurality of output terminals of the second copy circuit are respectively coupled to the third group port, the fourth group port, and the second cascade port, wherein the second copy circuit copies at least one of the first signal from the second protect port and a second signal from the second active port, and outputs one of the first signal and the second signal via the third group port and the fourth group port.

In an embodiment of the invention, the second copy circuit copies the first signal in response to no abnormality occurring in a signal source coupled to the second protect port, and outputs the first signal via the third group port and the fourth group port.

In an embodiment of the invention, the second copy circuit copies the second signal in response to no abnormality occurring in a signal source coupled to the second active port, and outputs the second signal via the second cascade port.

In an embodiment of the invention, the second copy circuit outputs the second signal via the third group port and the fourth group port in response to an abnormality occurring in the signal source coupled to the second protect port.

A redundancy method of a fronthaul network of the invention includes: obtaining a first fronthaul multiplexer including a first group port, a second group port, a first cascade port, a first protect port, a first active port, and a first uplink circuit, wherein the first uplink circuit includes a first summation circuit and a second summation circuit; configuring the first fronthaul multiplexer such that a plurality of input terminals of the first summation circuit are coupled to the first group port and the second group port respectively, and an output terminal of the first summation circuit is coupled to the first protect port; and configuring the first fronthaul multiplexer such that a plurality of input terminals of the second summation circuit are respectively coupled to the first cascade port and the output terminal of the first summation circuit, and an output terminal of the second summation circuit is coupled to the first active port.

Based on the above, the redundant system of the invention may provide redundant protection for transmission signals in the fronthaul network, wherein the fronthaul network may include the network between the user equipment (or radio unit) and the fronthaul multiplexer and the network between the fronthaul multiplexer and the baseband unit.

DESCRIPTION OF THE EMBODIMENTS

Figure 1:
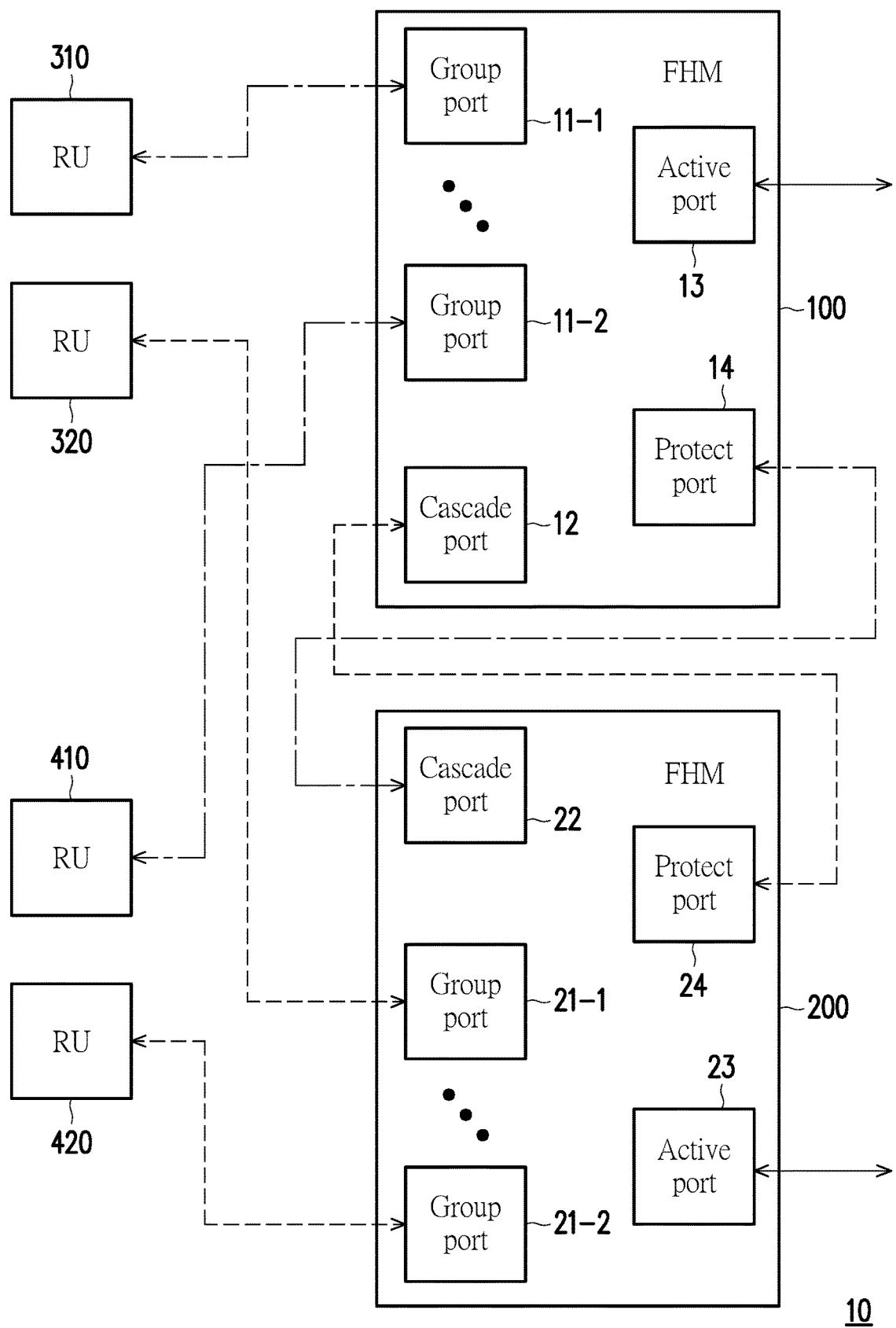
FIG. 1 shows a schematic diagram of a redundant system of a fronthaul network according to an embodiment of the invention.

FIG. 1 shows a schematic diagram of a redundant system 10 of a fronthaul network according to an embodiment of the invention. The redundant system 10 may include a fronthaul multiplexer 100 and a fronthaul multiplexer 200. In an embodiment, the redundant system 10 may further include a plurality of radio units, such as a radio unit 310, a radio unit 320, a radio unit 410, or a radio unit 420. The radio unit 310 and the radio unit 320 may be used to transmit a downlink signal to the same terminal device and receive an uplink signal from the same terminal device. The radio unit 410 and the radio unit 420 may be used to transmit a downlink signal to the same terminal device and receive an uplink signal from the same terminal device.

The fronthaul multiplexer 100 may include N (N may be a positive integer greater than or equal to 2) group ports, such as a group port 11-1 and a group port 11-2. The fronthaul multiplexer 100 may also include a cascade port 12, an active port 13, and a protect port 14. The N group ports of the fronthaul multiplexer 100 may be communicatively connected to N radio units (for example, the radio unit 310 and the radio unit 410), wherein the N radio units may communicate with different terminal devices respectively. The cascade port 12 may be coupled to the protect port 24 of the fronthaul multiplexer 200. The active port 13 may be used as a signal output terminal of the fronthaul multiplexer 100 when the redundant system 10 performs uplink transmission, and may be used as a signal input terminal of the fronthaul multiplexer 100 when the redundant system 10 performs downlink transmission. The protect port 14 may be coupled to the cascade port 22 of the fronthaul multiplexer 200.

The fronthaul multiplexer 200 may include N (N may be a positive integer greater than or equal to 2) group ports, such as a group port 21-1 and a group port 21-2. The fronthaul multiplexer 200 may also include a cascade port 22, an active port 23, and a protect port 24. The N group ports of the fronthaul multiplexer 200 may be communicatively connected to N radio units (for example, the radio unit 320 and the radio unit 420), wherein the N radio units may communicate with different terminal devices respectively. The cascade port 22 may be coupled to the protect port 14 of the fronthaul multiplexer 100. The active port 23 may be used as a signal output terminal of the fronthaul multiplexer 200 when the redundant system 10 performs uplink transmission, and may be used as a signal input terminal of the fronthaul multiplexer 200 when the redundant system 10 performs downlink transmission. The protect port 24 may be coupled to the cascade port 12 of the fronthaul multiplexer 100.

In an embodiment, the N group ports (for example, the group port 11-1 or 11-2) of the fronthaul multiplexer 100 respectively correspond to the N group ports (for example, the group port 21-1 or 21-2) of the fronthaul multiplexer 200. Corresponding group port pairs may be used to communicate with the same terminal device. For example, the corresponding group port 11-1 and group port 21-1 may communicate with the same terminal device via the radio unit 310 and the radio unit 320 respectively. The corresponding group port 11-2 and group port 21-2 may communicate with the same terminal device via the radio unit 410 and the radio unit 420 respectively.

Figure 2:
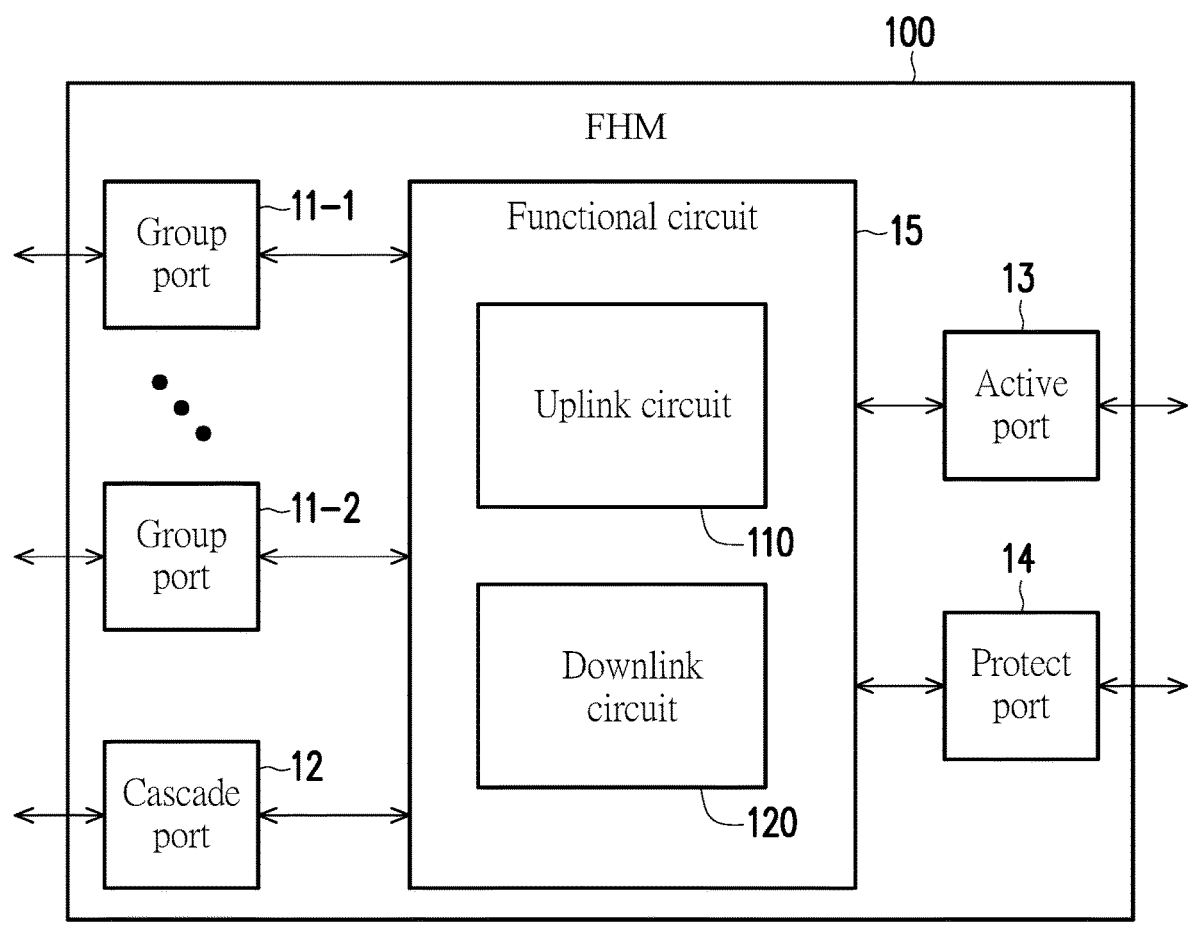
FIG. 2 shows a schematic diagram of a fronthaul multiplexer according to an embodiment of the invention.

The structure and function of the fronthaul multiplexer 100 may be exactly the same as the structure and function of the fronthaul multiplexer 200. Therefore, only the fronthaul multiplexer 100 is taken as an example to illustrate the fronthaul multiplexer of the invention. FIG. 2 shows a schematic diagram of the fronthaul multiplexer 100 according to an embodiment of the invention. The fronthaul multiplexer 100 may include a functional circuit 15. The N group ports (for example, the group port 11-1 or 11-2), the cascade port 12, the active port 13, and the protect port 14 of the fronthaul multiplexer 100 may be coupled to the functional circuit 15 respectively, wherein the functional circuit 15 may include an uplink circuit 110 and a downlink circuit 120.

Figure 3:
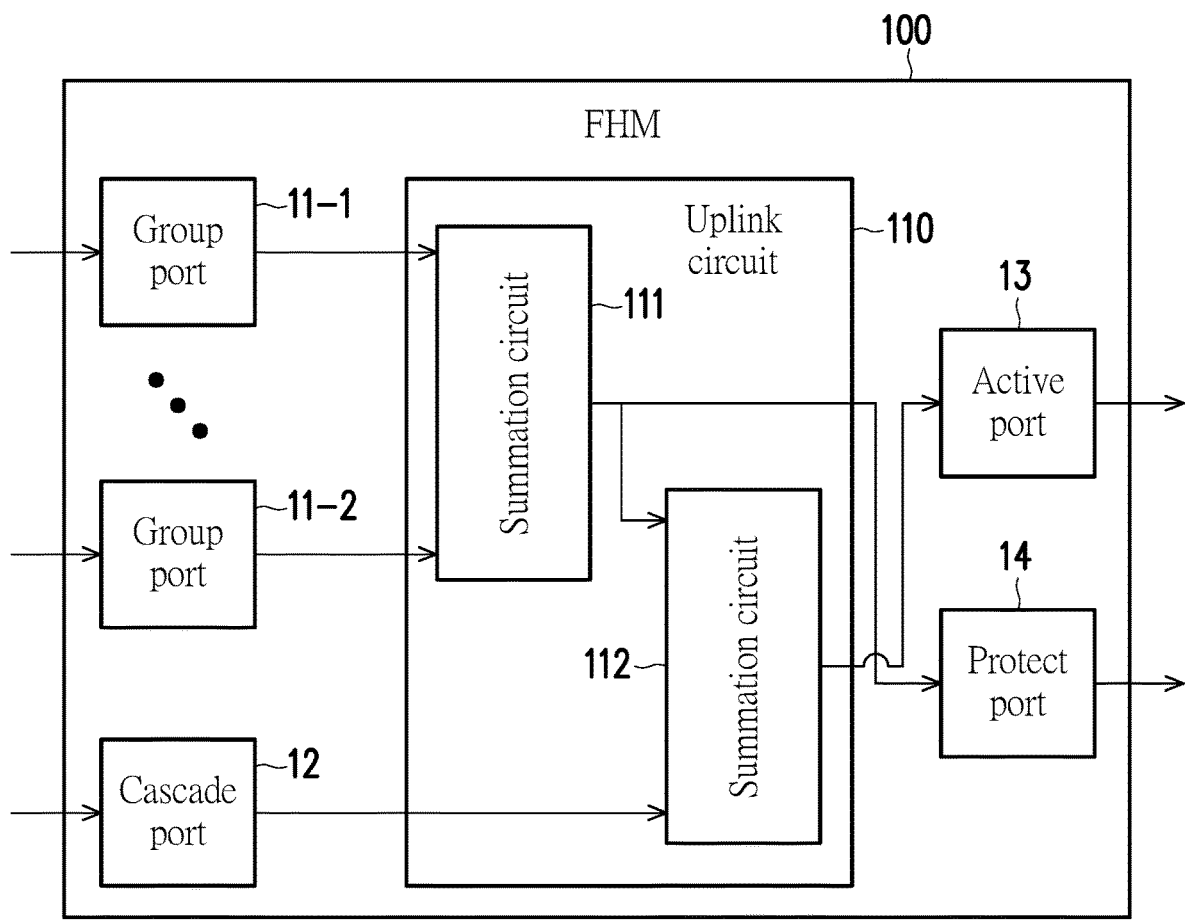
FIG. 3 shows a schematic diagram of a portion of a fronthaul multiplexer used for uplink transmission according to an embodiment of the invention.

FIG. 3 shows a schematic diagram of a portion of the fronthaul multiplexer 100 used for uplink transmission according to an embodiment of the invention. The uplink circuit 110 of the fronthaul multiplexer 100 may include a summation circuit 111 and a summation circuit 112. The summation circuit 111 (or the summation circuit 112) may be used to superimpose a plurality of input signals input to the summation circuit 111 (or the summation circuit 112) to output a superimposed signal.

A plurality of input terminals of the summation circuit 111 may be coupled to N group ports (for example, the group port 11-1 or 11-2) respectively. The output terminal of the summation circuit 111 may be coupled to the protect port 14. A plurality of input terminals of the summation circuit 112 may be coupled to the output terminal of the summation circuit 111 and the cascade port 12 respectively. The output terminal of the summation circuit 112 may be coupled to the active port 13. The summation circuit 111 may superimpose N signals respectively from N group ports (for example, the group port 11-1 or 11-2) to generate a superimposed signal, and output the superimposed signal to the protect port 14 and the summation circuit 112. The summation circuit 112 may superimpose a plurality of signals respectively from the summation circuit 111 and the cascade port 12 to generate a superimposed signal, and output the superimposed signal to the active port 13.

Figure 4:
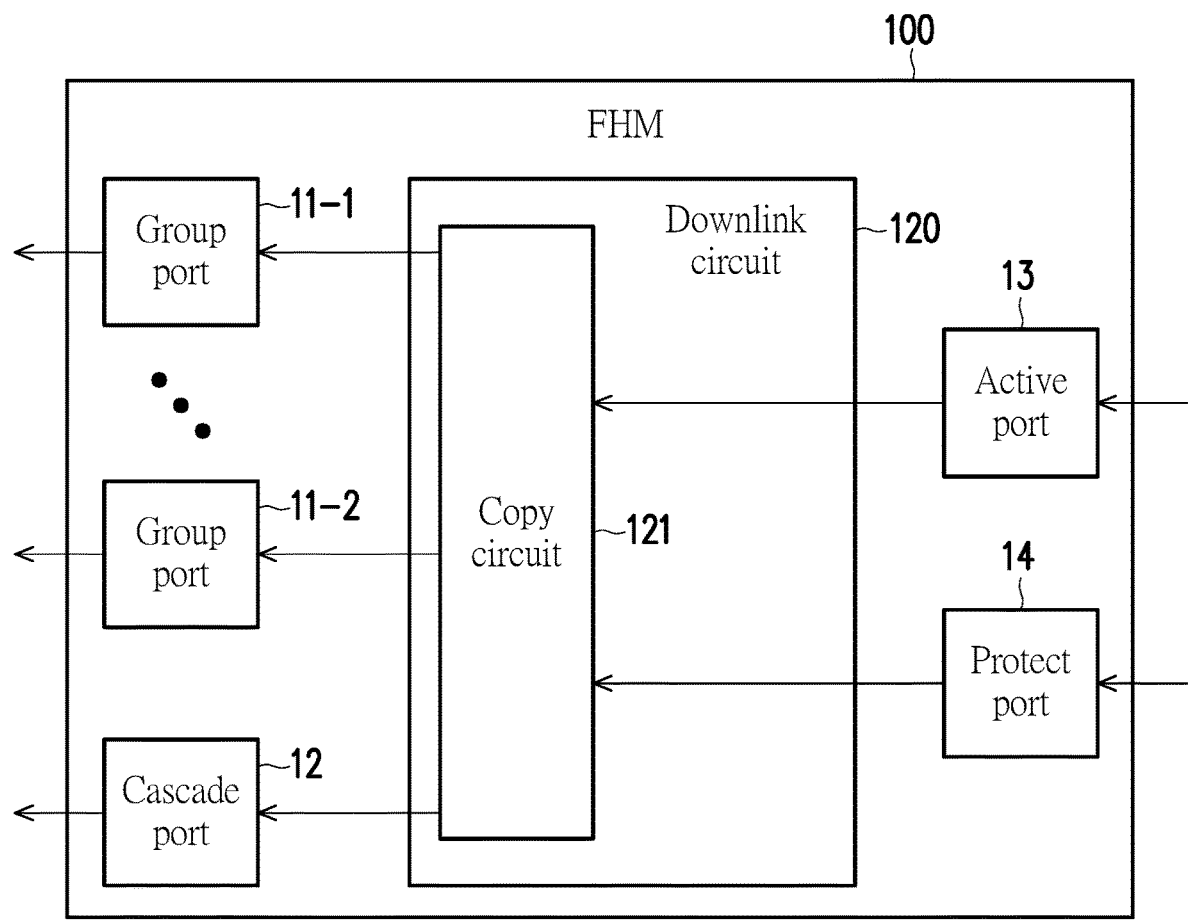
FIG. 4 shows a schematic diagram of a portion of a fronthaul multiplexer used for downlink transmission according to an embodiment of the invention.

FIG. 4 shows a schematic diagram of a portion of the fronthaul multiplexer 100 used for downlink transmission according to an embodiment of the invention. The downlink circuit 120 of the fronthaul multiplexer 100 may include a copy circuit 121. A plurality of input terminals of the copy circuit 121 may be coupled to the active port 13 and the protect port 14 respectively. A plurality of output terminals of the copy circuit 121 may be coupled to N group ports (e.g., the group port 11-1 or 11-2) and the cascade port 12 respectively.

In an embodiment, the copy circuit 121 may copy a signal from one of the active port 13 or the protect port 14 and output the copy signal via N group ports (e.g., the group port 11-1 or 11-2). Specifically, the copy circuit 121 may detect whether an abnormality occurs in the signal source (e.g., baseband unit) coupled to the active port 13. If there is no abnormality occurring in the signal source coupled to the active port 13, the copy circuit 121 may copy the signal from the active port 13 and output the copy signal via the group port 11-1, the group port 11-2, and the cascade port 12. Moreover, if an abnormality occurs in the signal source coupled to active port 13, the copy circuit 121 may copy the signal from the protect port 14 and output the copy signal via N group ports (e.g., the group port 11-1 or 11-2). If an abnormality occurs in the signal source coupled to the active port 13, the copy circuit 121 may not output the copy signal via the serial port 12.

In an embodiment, the copy circuit 121 may copy the signal from the active port 13 and/or the signal from the protect port 14 to generate a plurality of copy signals and output one of the plurality of copy signals via N group ports (for example: the group port 11-1 or 11-2). Specifically, the copy circuit 121 may detect whether an abnormality occurs in the signal source coupled to the protect port 14 (for example, the cascade port 22 of the fronthaul multiplexer 200). If an abnormality does not occur in the signal source coupled to the protect port 14, the copy circuit 121 may copy the signal from the protect port 14 and output the copy signal via N group ports (e.g., the group port 11-1 or 11-2). In other words, the fronthaul multiplexer 100 may forward the signal from the fronthaul multiplexer 200 to N terminal devices, wherein the N terminal devices are respectively communicatively connected to N group ports (for example, the group port 11-1 or 11-2) of the fronthaul multiplexer 100.

Moreover, the copy circuit 121 may detect whether an abnormality occurs in the signal source (e.g., baseband unit) coupled to the active port 13. If there is no abnormality occurring in the signal source coupled to the active port 13, the copy circuit 121 may copy the signal from the active port 13 and output the copy signal to the fronthaul multiplexer 100 via the cascade port 12. The copy signal received by the fronthaul multiplexer 100 may be used as a redundant signal. When no abnormality occurs in the signal source of the active port 13, if the copy circuit 121 detects that an abnormality occurs in the signal source coupled to the protect port 14 (for example, the cascade port 22 of the fronthaul multiplexer 200), the copy circuit 121 may output the copy signal corresponding to the signal source of the active port 13 via N group ports (e.g., the group port 11-1 or 11-2). Based on the above, the fronthaul multiplexer 100 may forward the signal from the fronthaul multiplexer 200 to a downstream terminal device when no abnormality occurs in the fronthaul multiplexer 200. If an abnormality occurs in the fronthaul multiplexer 200, the fronthaul multiplexer 100 may forward the signal received by the active port 13 to the downstream terminal device.

Figure 5:
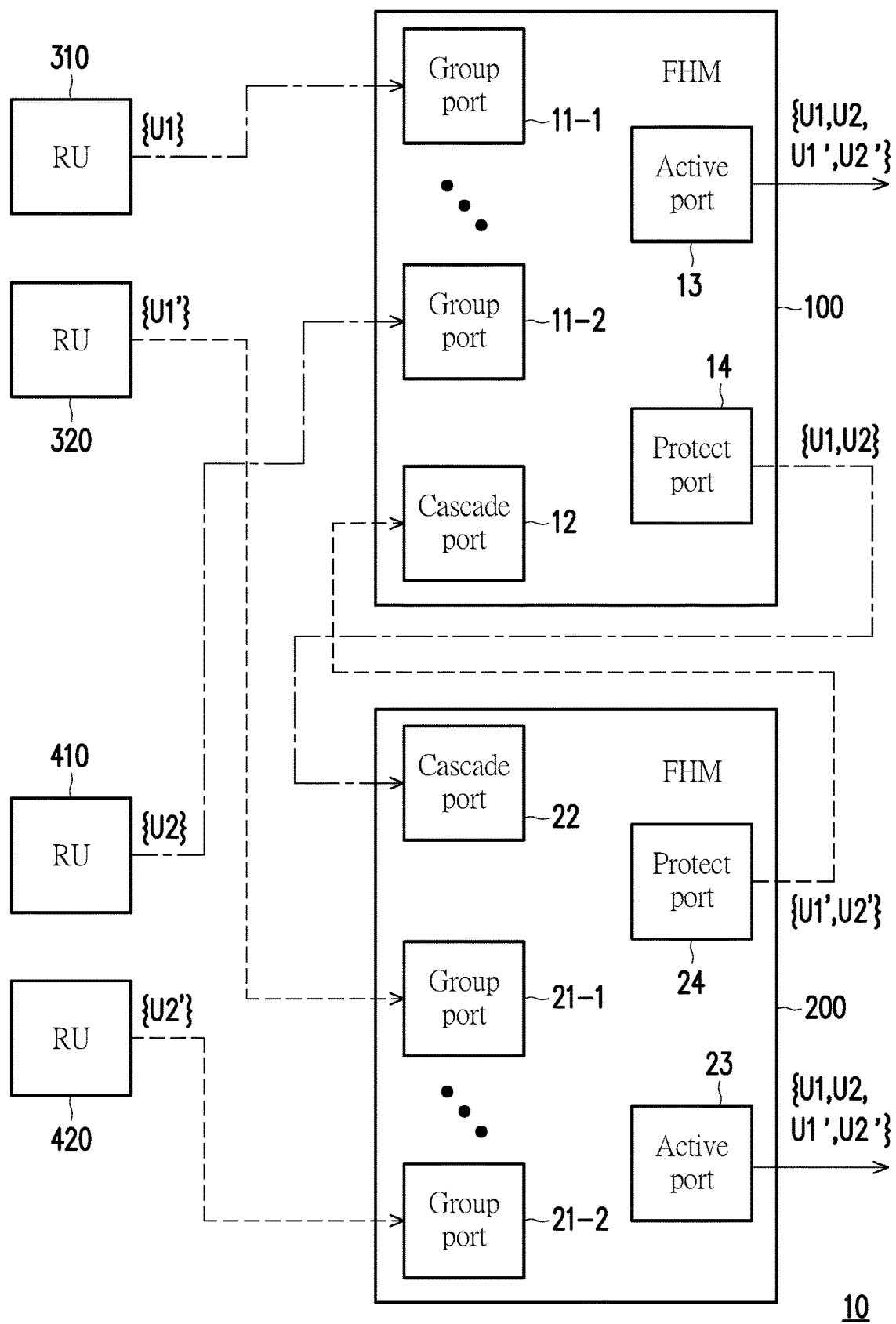
FIG. 5 shows a schematic diagram of a redundant system performing uplink transmission according to an embodiment of the invention.

FIG. 5 shows a schematic diagram of the redundant system 10 performing uplink transmission according to an embodiment of the invention. The radio unit 310 and the radio unit 320 may receive a signal U1 and a signal U1' respectively, wherein the signal U1 and the signal U1' come from the same signal source. The radio unit 410 and the radio unit 420 may receive a signal U2 and a signal U2' respectively, wherein the signal U2 and the signal U2' come from the same signal source. The radio unit 310 may forward the signal U1 to the group port 11-1. The radio unit 320 may forward the signal U1' to the group port 21-1. The radio unit 410 may forward the signal U2 to the group port 11-2. The radio unit 420 may forward the signal U2' to the group port 21-2. The summation circuit 111 of the fronthaul multiplexer 100 may superimpose the signal U1 from the group port 11-1 and the signal U2 from the group port 11-2 to generate a superimposed signal {U1, U2}, and transmit the superimposed signal {U1, U2} to the cascade port 22 of the fronthaul multiplexer 200 via the protect port 14. The cascade port 12 of the fronthaul multiplexer 100 may receive the superimposed signal {U1', U2'} from the protect port 24 of the fronthaul multiplexer 200. The summation circuit 112 of the fronthaul multiplexer 100 may superimpose the superimposed signal {U1, U2} from the summation circuit 111 and the superimposed signal {U1', U2'} from the cascade port 12 to generate a superimposed signal {U1, U2, U1', U2'}. The active port 13 of the fronthaul multiplexer 100 may forward the superimposed signal {U1, U2, U1', U2'} from the summation circuit 112 to an upstream equipment (for example: baseband unit).

In a similar manner to the fronthaul multiplexer 100, the fronthaul multiplexer 200 may superimpose the signal U1' from the group port 21-1 and the signal U2' from the group port 21-2 to generate the superimposed signal {U1', U2'}, and transmit the superimposed signal {U1', U2'} to the cascade port 12 of the fronthaul multiplexer 100 via the protect port 24. The cascade port 22 of the fronthaul multiplexer 200 may receive the superimposed signal {U1, U2} from the protect port 14 of the fronthaul multiplexer 100.

The fronthaul multiplexer 100 may superimpose the superimposed signal {U1, U2} and the superimposed signal {U1', U2'} from the cascade port 12 to generate the superimposed signal {U1, U2, U1', U2'}. The active port 23 of the fronthaul multiplexer 200 may forward the superimposed signal {U1, U2, U1', U2'} to an upstream equipment (for example: baseband unit).

Accordingly, when one of the radio units 310 and 320 fails, when one of the radio units 410 and 420 fails, or when one of the fronthaul multiplexers 100 and 200 fails, the redundant system 10 may still ensure that the uplink signals of the two terminal devices (i.e., the signal sources of the signals U1 and U1' and the signal sources of the signals U2 and U2') are forwarded to an upstream equipment (for example, the baseband unit). For example, when the fronthaul multiplexer 100 fails, the fronthaul multiplexer 200 may still transmit the superimposed signal {U1', U2'} to an upstream equipment. FIG. 5 shows that no abnormality occurs in any of the elements and signal sources (e.g., terminal devices) in the redundant system 10.

Figure 6:
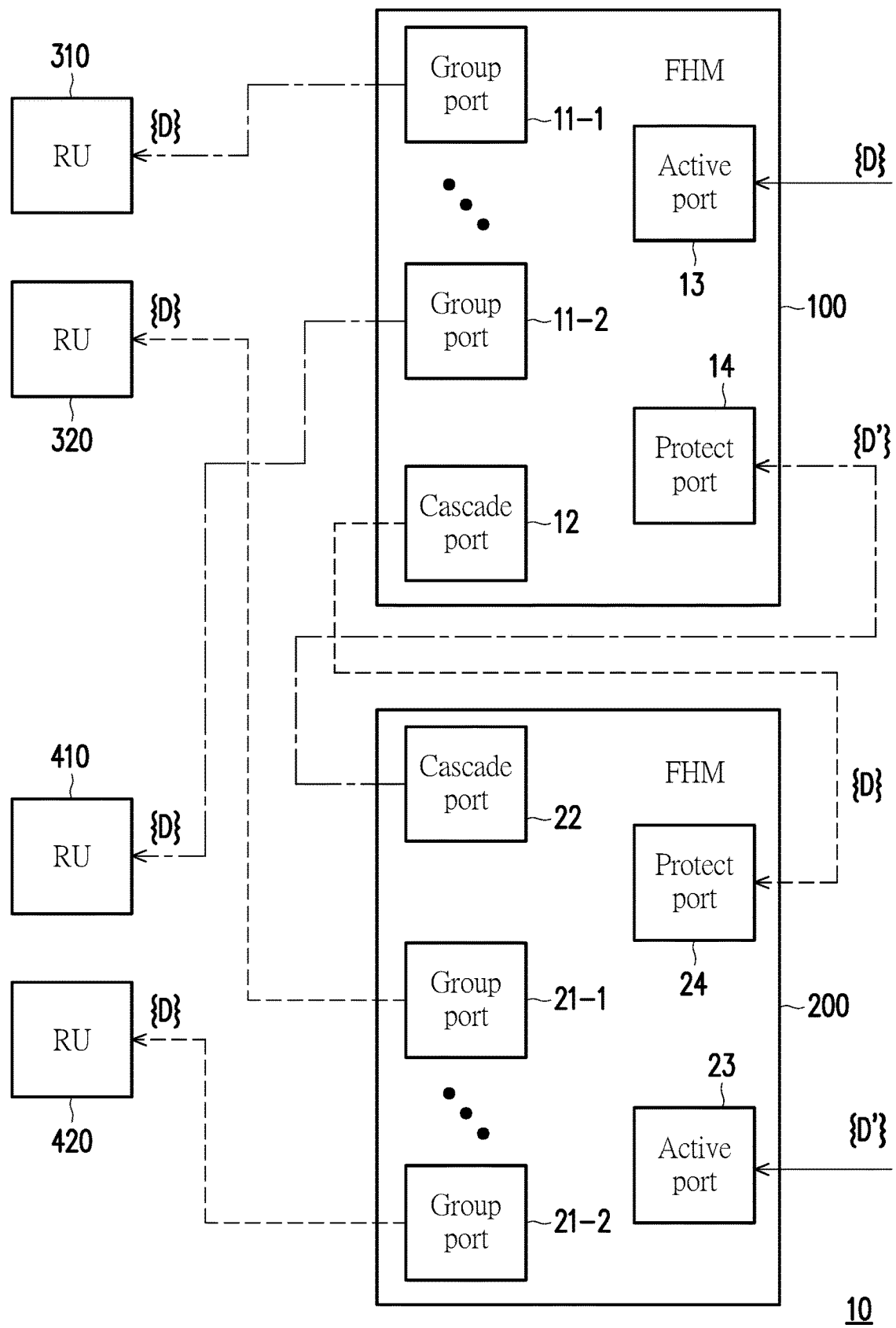
FIG. 6 shows a schematic diagram of a redundant system performing downlink transmission according to an embodiment of the invention.

FIG. 6 shows a schematic diagram of the redundant system 10 performing downlink transmission according to an embodiment of the invention. The active port 13 of the fronthaul multiplexer 100 and the active port 23 of the fronthaul multiplexer 200 may receive a signal D and a signal D' respectively, wherein the signal D and the signal D' come from the same signal source (for example: baseband unit).

When no abnormality occurs in the signal source coupled to active port 13, the copy circuit 121 of the fronthaul multiplexer 100 may copy the signal D received by the active port 13, and output the signal D to the radio unit 310, the radio unit 410, and the fronthaul multiplexer 200 via the group port 11-1, the group port 11-2, and the serial port 12 respectively. When an abnormality occurs in the signal source coupled to the active port 13, the copy circuit 121 of the fronthaul multiplexer 100 may copy the signal D' received by the protect port 14, and output the signal D' to the radio unit 310 and the radio unit 410 via the group port 11-1 and the group port 11-2 respectively, wherein the signal D' comes from the cascade port of the fronthaul multiplexer 200.

Moreover, when no abnormality occurs in the signal source coupled to active port 23, the fronthaul multiplexer 200 may copy the signal D' received by the active port 23 and output the signal D' to the fronthaul multiplexer 100 via the cascade port 22. If no abnormality occurs in the signal source coupled to the protect port 24 (i.e., the fronthaul multiplexer 100), the fronthaul multiplexer 200 may copy the signal D received by the protect port 24, and output the signal D to the radio unit 320 and the radio unit 420 via the group port 21-1 and the group port 21-2 respectively. If an abnormality occurs in the signal source coupled to the protect port 24, the fronthaul multiplexer 200 may copy the signal D' received by the active port 23, and output the signal D' to the radio unit 320 and the radio unit 420 via the group port 21-1 and the group port 21-2 respectively. FIG. 6 shows that no abnormality occurs in any of the elements and signal sources (e.g., baseband units) in the redundant system 10.

Figure 7:
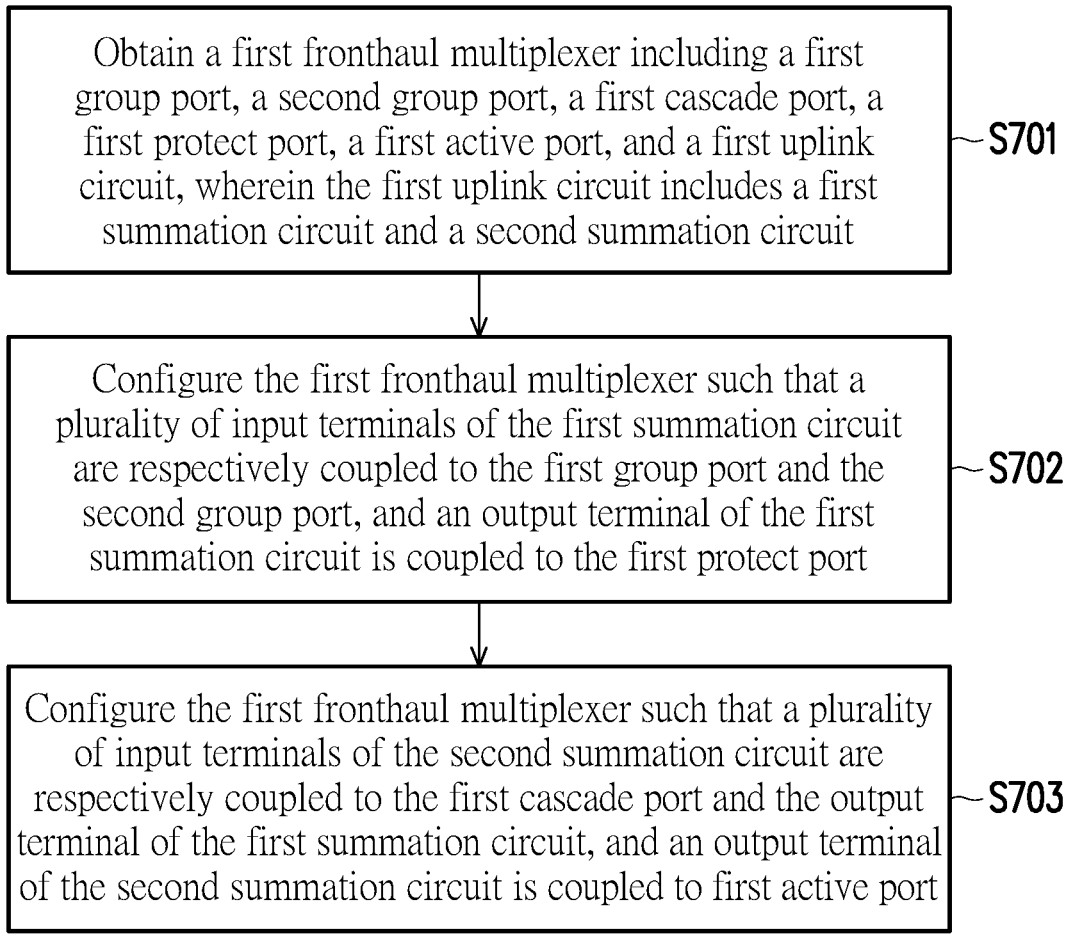
FIG. 7 shows a flowchart of a redundancy method for a fronthaul network according to an embodiment of the invention.

FIG. 7 shows a flowchart of a redundancy method of a fronthaul network according to an embodiment of the invention, wherein the redundancy method may be implemented by the redundant system 10 shown in FIG. 1. In step S701, a first fronthaul multiplexer including a first group port, a second group port, a first cascade port, a first protect port, a first active port, and a first uplink circuit is obtained, wherein the first uplink circuit includes a first summation circuit and a second summation circuit. In step S702, a first fronthaul multiplexer is disposed such that a plurality of input terminals of the first summation circuit are coupled to the first group port and the second group port respectively, and an output terminal of the first summation circuit is coupled to the first protect port. In step S703, a first fronthaul multiplexer is disposed such that a plurality of input terminals of the second summation circuit are coupled to the first cascade port and the output terminal of the first summation circuit respectively, and an output terminal of the second summation circuit is coupled to the first active port.

Based on the above, the redundant system of the fronthaul network of the invention may include the first fronthaul multiplexer and the second fronthaul multiplexer connected to each other. During uplink transmission, the first fronthaul multiplexer may detect signal sources via the plurality of radio units to provide redundant protection for the signal sources. Moreover, the protect port of the first fronthaul multiplexer may transmit the signal received by the first fronthaul multiplexer to the second fronthaul multiplexer, and the protect port of the second fronthaul multiplexer may transmit the signal received by the second fronthaul multiplexer to the first fronthaul multiplexer. Accordingly, the first fronthaul multiplexer and the second fronthaul multiplexer may provide redundant protection for each other's output signals. Moreover, during downlink transmission, the cascade port of the first fronthaul multiplexer may transmit the signal received by the first fronthaul multiplexer to the second fronthaul multiplexer, and the cascade port of the second fronthaul multiplexer may transmit the signal received by the second fronthaul multiplexer to the first fronthaul multiplexer. Accordingly, the first fronthaul multiplexer and the second fronthaul multiplexer may provide redundant protection for each other's input signals. Moreover, a plurality of group ports of the first fronthaul multiplexer (or the second fronthaul multiplexer) may also transmit the downlink signal to the plurality of radio units respectively, and then forward the downlink signal to different user equipment via the plurality of radio units. Accordingly, the redundant system may provide redundant protection for transmission signals between the first fronthaul multiplexer (or the second fronthaul multiplexer) and the plurality of user equipment.

What is claimed is:

1. A redundant system of a fronthaul network, comprising:
   a first fronthaul multiplexer comprising a first group port, a second group port, a first cascade port, a first protect port, a first active port, and a first uplink circuit, wherein the first uplink circuit comprises:
   a first summation circuit, wherein a plurality of input terminals of the first summation circuit are coupled to the first group port and the second group port respectively, and an output terminal of the first summation circuit is coupled to the first protect port; and
   a second summation circuit, wherein a plurality of input terminals of the second summation circuit are respectively coupled to the first cascade port and the output terminal of the first summation circuit, and an output terminal of the second summation circuit is coupled to the first active port.

2. The redundant system of claim 1, further comprising:
   a second fronthaul multiplexer comprising a third group port, a fourth group port, a second cascade port, a second protect port, a second active port, and a second uplink circuit, wherein the second protect port is coupled to the first cascade port, and the first protect port is coupled to the second cascade port, wherein the second uplink circuit comprises:
- a third summation circuit, wherein a plurality of input terminals of the third summation circuit are coupled to the third group port and the fourth group port respectively, and an output terminal of the third summation circuit is coupled to the second protect port; and
- a fourth summation circuit, wherein a plurality of input terminals of the fourth summation circuit are respectively coupled to the second cascade port and the output terminal of the third summation circuit, and an output terminal of the fourth summation circuit is coupled to the second active port.

3. The redundant system of claim 2, further comprising:
a first radio unit communicatively connected to the first group port and forwarding a first signal to the first group port; and
a second radio unit communicatively connected to the third group port and forwarding a second signal to the third group port, wherein a source of the first signal and a source of the second signal are the same.

4. The redundant system of claim 3, further comprising:
a third radio unit communicatively connected to the second group port and forwarding a third signal to the second group port; and
a fourth radio unit communicatively connected to the fourth group port and forwarding a fourth signal to the fourth group port, wherein a source of the third signal and a source of the fourth signal are the same.

5. The redundant system of claim 1, wherein the first fronthaul multiplexer further comprises:
a first downlink circuit, comprising:
- a first copy circuit, wherein a plurality of input terminals of the first copy circuit are respectively coupled to the first protect port and the first active port, and a plurality of output terminals of the first copy circuit are respectively coupled to the first group port, the second group port, and the first cascade port, wherein the first copy circuit copies a first signal from one of the first protect port and the first active port, and outputs the first signal via the first group port and the second group port.

6. The redundant system of claim 5, wherein the first copy circuit copies the first signal from the first active port in response to no abnormality occurring in a signal source coupled to the first active port, and outputs the first signal via the first cascade port.

7. The redundant system of claim 5, wherein the first copy circuit copies the first signal from the first protect port in response to an abnormality occurring in a signal source coupled to the first active port.

8. The redundant system of claim 5, further comprising:
a second fronthaul multiplexer comprising a third group port, a fourth group port, a second cascade port, a second protect port, a second active port, and a second downlink circuit, wherein the second protect port is coupled to the first cascade port, and the first protect port is coupled to the second cascade port, wherein the second downlink circuit comprises:
- a second copy circuit, wherein a plurality of input terminals of the second copy circuit are respectively coupled to the second protect port and the second active port, and a plurality of output terminals of the second copy circuit are respectively coupled to the third group port, the fourth group port, and the second cascade port, wherein the second copy circuit copies at least one of the first signal from the second protect port and a second signal from the second active port, and outputs one of the first signal and the second signal via the third group port and the fourth group port.

9. The redundant system of claim 8, wherein the second copy circuit copies the first signal in response to no abnormality occurring in a signal source coupled to the second protect port, and outputs the first signal via the third group port and the fourth group port.

10. The redundant system of claim 8, wherein the second copy circuit copies the second signal in response to no abnormality occurring in a signal source coupled to the second active port, and outputs the second signal via the second cascade port.

11. The redundant system of claim 10, wherein the second copy circuit outputs the second signal via the third group port and the fourth group port in response to an abnormality occurring in a signal source coupled to the second protect port.

12. A redundancy method of a fronthaul network, comprising:
obtaining a first fronthaul multiplexer comprising a first group port, a second group port, a first cascade port, a first protect port, a first active port, and a first uplink circuit, wherein the first uplink circuit comprises a first summation circuit and a second summation circuit;
configuring the first fronthaul multiplexer such that a plurality of input terminals of the first summation circuit are coupled to the first group port and the second group port respectively, and an output terminal of the first summation circuit is coupled to the first protect port; and
configuring the first fronthaul multiplexer such that a plurality of input terminals of the second summation circuit are respectively coupled to the first cascade port and the output terminal of the first summation circuit, and an output terminal of the second summation circuit is coupled to the first active port.

* * * * *